United States Patent [19]

Hefele

[11] Patent Number: 4,602,057

[45] Date of Patent: Jul. 22, 1986

[54] COPOLYAMIDE ADHESIVE CONTAINING BEHENIC ACID

[75] Inventor: Josef Hefele, Gräfelfing, Fed. Rep. of Germany

[73] Assignee: Kufner Textilwerke GmbH, Munich, Fed. Rep. of Germany

[21] Appl. No.: 644,024

[22] Filed: Aug. 24, 1984

[30] Foreign Application Priority Data

Oct. 6, 1983 [DE] Fed. Rep. of Germany ....... 3336417

[51] Int. Cl.$^4$ .............................................. C08L 77/00
[52] U.S. Cl. ................................... 524/300; 524/284; 528/335; 528/336
[58] Field of Search ................. 524/300, 284; 528/336

[56] References Cited

U.S. PATENT DOCUMENTS 4,452,931 6/1984 Okamoto et al. ................... 524/300

*Primary Examiner*—Harold D. Anderson
*Attorney, Agent, or Firm*—Charles F. Meroni, Jr.

[57] ABSTRACT

The invention concerns a heat-sealing adhesive on the basis of copolyamides for the coating of fabrics, and especially of linings for outerwear. The invention consists of the fact that this heat-sealing adhesive contains from 0.3 to 15% by weight, preferably 0.7 to 12% by weight, of behenic acid. Thereby a substantially and unexpectedly increased adhesion strength of the adhesive is attained, so that for the same adhesive strength a smaller amount of the heat-sealing adhesive is required. This improves the comfort provided by the article of clothing when being worn.

The invention also concerns a process for the manufacture of this heat-sealing adhesive as well as its use for the coating of lining fabrics.

17 Claims, No Drawings

COPOLYAMIDE ADHESIVE CONTAINING BEHENIC ACID

The invention concerns a heat-sealing adhesive on the basis of copolyamides for the coating of fabrics, especially of linings such as woven, knitted or lining materials on a fleece basis for outerwear. The invention concerns moreover a process for the manufacture of this heat-sealing adhesive and its use.

For the coating of linings for outerwear, by far the most frequently used copolyamides for the heat-sealing adhesive are those which have a low melting range. As a rule the adhesives are applied in dotted form, either as a powder on embossing cylinders or as a paste on rotary film screens, and are then sintered on, after previous drying in the case of pastes. Cuts from the linings thus coated are ironed in the clothing industry onto the rear of top cloth cuts to maintain the necessary shape in the finished articles of clothing.

In order to ensure the requisite dry-cleaning and laundry resistance of the fused composition of lining and top cloth, a minimal amount of adhesive substance is required which inter alia is also dependent on the screen arrangement of the dots, the construction of the lining, the finish of the lining, the drying and sintering conditions and not least on the type and composition of the adhesive substance. The greater the amount of the adhesive, the more it influences the handle of the fused composite, so that a certain degree of more or less strong stiffening of the composite is inevitable.

But modern convenience in wear demands ever more lining materials whose stiffening effect is as low as possible. In many cases the ideal situation envisaged by the garment industry goes so far that it desires linings which only effect the shape retention and stabilization of the textile composite, but no longer causes any handle-stiffening. But this result of the industry's wishes is not attainable in practice.

However one can attempt to approach it for example by the use of improved adhesives which already provide the necessary minimum of adhesion with a substantially reduced coating weight.

The invention is therefore based on the object of discovering a heat-sealing adhesive on the basis of copolyamides which shows the same adhesive strength as the previous fusion adhesives on the basis of copolyamides, yet has a clearly lower coating weight.

Due to the presence of behenic acid in the amount stated, the adhesion of the normal trade heat-sealing adhesive based on copolyamides is clearly increased, on average by between 20 and 25%. This is in total contrast to the expectations of the expert, since such a combination should rather reduce the adhesive strength, because behenic acid ought to cause a separating effect owing to its long aliphatic share with an apolar character. But surprisingly the exact opposite is the case. Using the invention it is possible to reduce the former coating amount by about the percentage of the attainable increase in adhesion. This does not only save the very costly coating material. The softer handle desired by the garments industry is brought clearly closer.

It is true that heat-sealing adhesives which contain fatty acids in general are known. Thus heat-sealing adhesives have been described which contain stearic acid, palmitic acid, oxystearic acid, and acidic wax. But the special effectiveness of behenic acid does not emerge from the prior art as prepublished. Its above-mentioned efficiency could moreover not have been expected because owing to the polarity difference, one would have had to assume that no molecular distribution takes place between the copolyamides and the behenic acid, and that the inhomogenous property of the adhesive would be the cause of a diminution in the adhesive strength. Thus all the more surprising is the effectiveness discovered with the invention, both with modified heat-sealing substances which are applied in paste form and with those which are applied in the form of powder.

Using the powder coating form, modified heat-sealing adhesives have been found to be especially suitable which contain from 0.3 to 2.5%, preferably 0.8-1.5%, of behenic acid.

To provide the powdery initial product of the copolyamide for the powder type of application with the cited amount of behenic acid, it is expedient to mix the finely-ground behenic acid as evenly as possible with the copolyamide powder and then to subject the mixture to a temperature treatment above the melting point of the behenic acid (about 80° C.), but below the melting point of said copolyamide (on average from 110° to 125° C.). In this way a powdery initial product modified with behenic acid is obtained, whose powdery grains are evenly charged with behenic acid. This tempered product can be used directly for coating in accordance with the powder dot process or it can be additionally mixed with untreated copolyamide and then used for the powder dot coating. The latter mixtures are preferable.

EXAMPLE 1

The manufacture of a powder-coating heat-sealing adhesive according to the invention can for example be done in the following manner (pbw=parts by weight).

100 pbw copolyamide 6/6.6/12 0-160 microns, melting point about 112° C., melt index 160° C. ca.25 g/10 min. and 2 pbw behenic acid, finely ground, less than 20 microns, are pre-mixed in a rapid mixer and are then remixed by sifting. The mixture is tempered while sealed for 24 hrs. at 90° C. After the mixing a further 100 pbw copolyamide powder 6/6.6/12 (see above) are added and mixed again in the rapid mixer. This final mixture with a share of about 1% behenic acid is now used for powder coating in the powder dot coating process, e.g. as follows:

A 16-mesh engraving roller is used, on which the calotte-shaped engraving recesses are evenly arranged so that the calotte centers are always located at the corners of the triangles on the same side, with a spacing of said calotte centers of 1.6 mm. The engraving depth is 0.31 mm and the diameter of the engraving on the roller surface is 0.75 mm. As the carrier for the coating a woven and knitted fabric is used consisting of a loop-forming chain of polyamide multifilament yarns 44 dtex and 13 filaments, with 24 warps/inch and a spun rayon weft yarn Nm 20 inserted in said loops made of spun rayon staple fiber 4.0 cm in length and with 1.7 dtex fiber thickness. The weft thickness amounts to 120 picks/10 cm. In each loop one pick is inserted. The loop-forming warp ends extend respectively straight forward with three loops and then are laterally displaced to the right or left with the subsequent loop by one row of loops. The woven and knitted fabric is roughened on the warp side before the coating, then washed out and made shrink-resistant.

When comparing the adhesive strengths as between siliconised poplin top cloth and the support fabric, coated on one hand with untreated copolyamide and on the other with the inventively treated copolyamide, we obtain the differences which are found in the comparative table (Table 1) below. In both cases a steel blade doctor was used with 0.2 mm thickness. The engraving roller temperature is 45° C. while the hot-rolling temperature is 240° C. and the coating speed is 10 m/min.

TABLE 1

Fixing conditions: 165° C. top plate temperature, 100° C. bottom plate temperature 300 p/cm² pressure, 15 sec., fixed on siliconised poplin

| Coating Powder | Coating Weight g/m² | Adhesion in p/5 cm | p/g/5 cm | Breakage after fixing | Treatment after fixing |
|---|---|---|---|---|---|
| Normal trade polyamide powder without behenic acid | 17.3 | 1200 | 69.3 | after 2 hrs. | — |
|  |  | 1500 | 86.3 | after 2 days | — |
|  |  | 1650 | 95.3 | after 2 days | +1 dry-cleaning |
| normal trade polyamide powder with ca. 1% of behenic acid | 13.4 | 1325 | 100 | after 2 hrs. | — |
|  |  | 1500 | 111.9 | after 2 days | — |
|  |  | 1550 | 115.9 | after 2 days | +1 dry-cleaning |

As the table shows, with an additive of 1% behenic acid according to the mixture prescribed above at a coating weight falling from 17.3 to 13.4 g/m², practically the same adhesive strength is achieved with only slight differences.

The amount of additive of behenic acid should not be more than 2.5% for powder dot coatings, since due to the addition of the behenic acid the coating weight is reduced. But this reduction is only desirable to a level at which the necessary minimal adhesive strength is attained. The reduction of this coating amount provides the desirable softer handle.

In the case of the powdery type of coating, behenic acid reduces very clearly the blocking tendency, when used in an amount such as is cited above for the mixture, of the adhesive. This is especially significant when cutting the linings. As a rule a stack of superimposed adhesive coated plys of fabric are cut, whereby the adhesive side is laid on the adhesive side and is then cut using a band knife. In this process there might be some conglutination of the directly superimposed adhesive layers. This conglutination is certainly avoided by the addition of behenic acid. The reduction of the blocking tendency is more marked than when using stearic acid.

The increase in the adhesive strength by the behenic acid additive and/or the possibility of reducing the coating weight with said additive is not restricted solely to the powder dot coating process. In paste coating too there is an increase in the adhesive strength when the heat-sealing adhesive applied as paste contains behenic acid on the copolyamide base. The share of the behenic acid in the adhesive mass can rise to 15%. Preferably for pastes a share of from 4 to 12% is used.

In the initial paste the behenic acid can be present in a similar form and can take effect like the fatty acids, e.g. stearic acid, according to the two patents DE-PS Nos. 2 007 791 and 229 308. In the presence of thickening agents dissolved in water, such as the ammonium salts of polymer acids, e.g. polyacryl acid, but also of other thickening agents dissolved in water, such as hydroxyethyl cellulose, the behenic acid acts in an alkaline medium, preferably ammonia alkaline or amine-alkaline, whose amines should be of a volatile nature, for copolyamide powders as a dispersing agent, which retains the water in the paste and reduces the drying out or hardening of the paste before the doctor during the printing process. Since the latter effect is less marked with behenic acid than it is with stearic acid, it is expedient to use additionally fatty acid aluminium- or alkaline earth salts such as finely dispersed magnesium stearate, which substantially favours the retentive capacity. The share of such salts in the dried heat-sealing adhesive should be from 0.5 to 3% by weight.

Apart from the named products, the initial paste can also contain softeners, small amounts of organic solvents, optical brighteners, dyes, high-polymer ethylene oxide and also fillers.

EXAMPLE 2

A suitable printable initial paste which leaves the inventive heat-sealing substance after drying and sintering on the printed fabric consists e.g. of the following components of a flowable pasty mixture:

100 pbw water
11 pbw behenic acid
20 pbw ammonia alkaline 10% solution of polyacrylic acid ammonium, pH=11,
10 pbw softener (e.g. benzenesulfonic acid —N—(2-oxypropyl) amide)
100 pbw 6/6.6/12-copolyamide powder 0 to 80 microns,
1 pbw most finely dispersed magnesium stearate
0.1 pbw polyethylene oxide, molecular weight $5 \times 10^6$,
0.1 pbw butanol.

This paste batch is applied in the screen printing process with a rotary screen having 11-mesh screen (arrangement of the perforations on the corner points of regular triangles spaced at 1/11 inch) onto the above named woven/knitted goods of polyamide multifilament yarn 44/14 as the warp and spun rayon yarn as the weft material Nm 20 using an inner doctor in a coating amount of 20 g/m² (dry weight), and is dried at 135° C. in 4 minutes and sintered. After sintering we obtain a fusion adhesive which contains a share of behenic acid of 10%.

Comparison with a paste coating of the same composition, but containing stearic acid in the same amount instead of behenic acid, can be found in Table 2 below. The table shows the adhesive values in p/5 cm on various top cloths. The fixings (shines) were carried out at 165° C. top plate temperature, 100° C. base plate temperature, 300 p/cm², 15 sec. of fixing time. The adhesion was measured 24 hours after fixing and additionally after dry-cleaning once. The coating weight was identical for both types of fusion adhesive.

TABLE 2

| Top cloth | Fusion adhesive with 10% stearic acid Adhesion p/5 cm | | Fusion adhesive with 10% behenic acid Adhesion p/5 cm | |
| --- | --- | --- | --- | --- |
| | after 24 hrs. | After 24 h.+ dry-cleaning (1×) | after 24 h. | After 24 h + 1× dry cleaning |
| Fishbone top cloth of wool | 1900 | 1775 | 1950 | 2150 |
| Siliconised poplin | 850 | 1050 | 1950 | 1800 |
| Gabardine top cloth | 2375 | 1650 | 2750 | 2250 |

Similar results are obtained with dried samples after a laundry process at 40° C. in a domestic washing machine.

As can be seen from Table 2, with top cloths which are especially hard to shine, the adhesion strength increase is most marked. The increase can be more than 50%. Since especially difficult top cloths with respect to fixing are also those which may form bubbles when the coating amounts used are in the limit area, the inventive heat-sealing adhesive offers to the garment industry in such cases in particular a high degree of safety, when a wide range of top cloths have to be processed with great softness of the fixed composite.

The paste coating using the inventive heat-sealing adhesive with behenic acid also has the great advantage that the printed paste can be dried and sintered at higher temperatures than with pastes having a stearic acid additive. Thus the speed of production can be increased. Even at higher drying temperatures the coating points do not subside into the support fabric. The coating points using behenic acid are more elevated and thus they have a greater height than in the case of stearic acid. Presumably the elevated point formation is also one of the reasons for the improved adhesion.

I claim:

1. A heat-sealing adhesive consisting of a copolyamide and 0.3 to 15% by weight behenic acid.

2. The adhesive of claim 1 containing from 0.7 to 12% by weight behenic acid.

3. A powder adhesive of claim 1 containing behenic acid amounts from 0.3 to 2.5% by weight.

4. The adhesive of claim 3 containing from 0.8 to 1.5% by weight behenic acid.

5. A dried adhesive of claim 1 containing 4 to 12% by weight behenic acid.

6. A heat-sealing adhesive consisting of a copolyamide, 0.3 to 15% by weight behenic acid, and an additive selected from the group consisting of a softener, an organic solvant, an optical brightener, a dye, a filler, a high-polymer ethylene oxide, and mixtures thereof.

7. A process for the manufacture of the heat-sealing adhesive of claim 1 wherein the behenic acid is from 0.3 to 2.5% by weight is added to a copolyamide powder in finely-powdered form to form a mixture.

8. The process of claim 7 wherein the mixture is subjected to a treatment at temperatures above the melting point of the behenic acid, yet below the melting point of said copolyamide powder.

9. A fabric coated with a heat-sealing copolyamide adhesive of claim 1 wherein the adhesive contains from 0.3 to 15% by weight of behenic acid.

10. A heat-sealing copolyamide adhesive for outerwear linings consisting of copolyamide and 0.3 to 15% by weight behenic acid.

11. A method comprising coating a fabric with the adhesive of claim 1.

12. The method of claim 11 wherein the content of behenic acid is from 0.7 to 12% by weight.

13. The method of claim 11 wherein the adhesive is a powder and has behenic acid amounts from 0.3 to 2.5% by weight.

14. The method of claim 13 wherein the content of behenic acid is from 0.8 to 1.5% by weight.

15. The method of claim 11 wherein the adhesive is a paste and the content of behenic acid is from 4 to 12% by weight when in a dried adhesive substance.

16. A heat sealing adhesive consisting of a copolyamide, 0.3–15% by weight of behenic acid, 0.5–3% by weight of at least one of alkaline earth or aluminum salts of fatty acids in the dried adhesive.

17. A method comprising coating a fabric with an adhesive, said adhesive consisting of a paste having a content of behenic acid from 4 to 12% by weight when in a dried adhesive substance, the dried adhesive substance including alkaline earth or aluminum salts of fatty acids from 0.5 to 3% by weight.

* * * * *